United States Patent [19]

Meredith et al.

[11] 4,198,021

[45] Apr. 15, 1980

[54] CONTROL SYSTEMS

[75] Inventors: James F. Meredith; Brian Williams, both of Cheltenham, England

[73] Assignee: Smiths Industries Limited, London, England

[21] Appl. No.: 921,524

[22] Filed: Jul. 3, 1978

[30] Foreign Application Priority Data

Jul. 4, 1977 [GB] United Kingdom ............... 27933/77

[51] Int. Cl.$^2$ ............................................... G05D 1/00
[52] U.S. Cl. .................................... 244/194; 244/83 E; 318/564
[58] Field of Search ................. 244/83 E, 194; 91/361, 91/363 R, 363 A; 318/564, 562, 615, 621, 584, 585, 586; 340/187

[56] References Cited

U.S. PATENT DOCUMENTS

| | | | |
|---|---|---|---|
| 3,095,783 | 7/1963 | Flindt | 244/194 |
| 3,688,099 | 8/1972 | Buscher | 318/564 |
| 4,130,241 | 12/1978 | Meredith | 318/564 |

Primary Examiner—Charles E. Frankfort
Assistant Examiner—Reinhard J. Eisenzopf
Attorney, Agent, or Firm—Pollock, VandeSande and Priddy

[57] ABSTRACT

A control system for controlling displacement of the aerodynamic control-surfaces of an aircraft includes a first signal processor that is supplied with input signals from the pilot's control column and also with predominantly lower-frequency components of feedback signals derived in accordance with the actual position of the control surfaces. The first signal processor derives an intermediate signal from the input and feedback signal components by digital processing and supplies this intermediate signal to a second signal processor which also receives the predominantly higher-frequency components of the feedback signal. The second signal processor derives an output signal from the intermediate and feedback signal components by analogue processing and supplies this to an actuator for controlling displacement of the control-surfaces. The second signal processor may also receive additional feedback signals directly from the actuator. The system may be used in quadruplex, including four first and second processors to produce four output signals in response to four input signals, wherein two monitor circuits both receive the four intermediate signals and operate to reject any of those intermediate signals which differ from the other intermediate signals by more than a predetermined amount. The monitor circuits amalgamate those intermediate signals not rejected and supply output signals representative of those intermediate signals to additional second signal processors which in turn produce output signals to additional actuators.

12 Claims, 2 Drawing Figures

CONTROL SYSTEMS

BACKGROUND OF THE INVENTION

This invention relates to control systems, and particularly, though not exclusively, to aircraft flight-control systems.

This invention is particularly concerned with control systems of the kind in which data feed back from the control output of the system are compared with the input data supplied to the system to detect any difference between the actual output and the desired output as represented by the input data. The system modifies the output as necessary to maintain the difference as small as possible, so that the output varies in accordance with the input.

An example of the use of a control system incorporating feedback is the servocontrol of the position of an aircraft's flight-control surfaces (for example, the elevators) in accordance with the pilot's operation of the control column. For control of the elevators, the position of the control column in the fore and aft direction is sensed by transducers coupled to the column, and input signals representative of this position are supplied by the transducers to respective control computers.

The control computers also receive feedback signals from transducers sensing the position of the elevators and compare these feedback signals with the input signals to determine any error between the elevator position demanded by the pilot and the actual elevator position. An output signal is generated by each control computer for application, in normal circumstances, to a respective actuator to move the elevators as required to reduce the error. For reasons of safety, it is common practice to provide three or more control computers and respective associated transducers so as to provide a degree of redundancy to ensure continued correct control in spite of the occurrence of a fault or failure in the system. If the output signal of one of the control computers differs from those of the other computers by a larger amount than would be expected on the basis of known manufacturing and operating tolerances, that computer is regarded as being faulty, and is prevented from continuing to contribute to the control of the elevators.

In the past, the control computers of control systems have commonly been based on analogue processing techniques. In an analogue processing unit, each variable is represented by the magnitude of a parameter such as voltage or current. The magnitude of such a parameter can vary continuously over a range of values in proportion to the magnitude of the variable it represents. Each calculation takes place in a separate circuit specially designed to perform that calculation and permanently dedicated to it. Thus all the calculations involved in deriving the output control signal may be performed more or less concurrently (allowing for delays in signal transmission between circuits, for example), since for each calculation there is a circuit continuously available to perform the calculation and supply the result to the circuit for the next calculation. In general, therefore, the predominant factor limiting the speed of response of the output signal to changes in the input signal has been the propagation time of signals in the computer, rather than, for example, the total number of calculations and their sequence.

However, the application of digital computing techniques to control computers has altered the relative significance of possible limitations on the speed of computation. Digital computation involves assigning the magnitude of a variable to one of a finite number of discrete magnitude increments which together embrace the full range of possible magnitude of the variable. Each magnitude increment is identified by a respective and different numeral (generally in binary form) the magnitude of the numeral being indicative of the location, within the magnitude range, of the respective increment. The magnitude of a variable can thus be represented by the appropriate combination of binary digits, which is in turn represented electrically by a corresponding combination of voltages or currents each having one of two fixed magnitudes. Accurate storage and transmission of variables represented in this way can be effected more easily and reliably than is the case with variables represented in analogue form. Consequently, digital calculations are performed successively in a single, general-purpose calculation circuit, the data involved in each calculation and the results thereof being transmitted from and to a digital storage circuit. The operation of the calculation circuit is not limited to any particular calculation, but is adapted and controlled for each successive calculation by a program of instructions which are also retained in the storage circuit. This mode of operation permits great flexibility in the range of computation which can be performed by a digital processing unit since a modification, or even a complete substitution, of a computation can be accomplished merely by altering the program of instructions contained in electrical-signal form in the storage sircuit.

The calculation circuit can, however, handle only one calculation at a time, each calculation in the overall computation of, for example, an output command signal being completed and the result stored for use in subsequent calculations before the next calculation is commenced. Until a full cycle of calculations involved in a computation of an output signal is completed, there is no output signal available from that computation. In control computers it is common practice to retain each successive computer output signal in analogue form in a sample-and-hold circuit and supply it therefrom for the duration of the following computation cycle, until the result of that computation becomes available and can in turn be stored and supplied. Thus the speed of response of a control system incorporating digital computing techniques depends on the speed of operation of the calculation circuit, the time taken for exchange of data between the calculation circuit and the storage circuit, and the length and complexity of the sequence of calculations involved in computing the output signal.

If any input parameter upon which the calculations are based changes during a sequence of calculations, such change may not be manifested as a corresponding change in the output signal until the end of the next following sequence of calculations. Similarly, any cyclic variation in an output parameter with a period of the same order as, or shorter than, the period of one calculation cycle, cannot be followed (and therefore corrected accurately by the output signal).

In the case of aircraft flight-control, for example, it is desirable that any oscillation in the position of a flight-control surface should be detected and neutralized as quickly as possible. Such oscillation may be caused by 'hunting' of an actuator about its correct position and, if this is not damped out by the flight-control system, may result in a dangerous instability in the aircraft's attitude.

In known systems using digital processing techniques, the required speed of response has been achieved only by using very fast (and therefore, very expensive) digital processing equipment which can accomplish a full cycle of calculations in a period less than that of the fastest possible unwanted oscillation.

BRIEF SUMMARY OF THE INVENTION

It is an object of this invention to provide a control system which is suitable for use with digital processing techniques but which reduces or avoids the need for digital processing equipment capable of very high rates of operation.

According to the present invention there is provided a control system for deriving an output for control of an operative function, by means of processing of an input signal and of a feedback signal which is indicative of the operative function, said system having a first signal processing means which is supplied with said input signal and which derives by digital processing an intermediate signal, and a second signal processing means which is supplied with said intermediate signal and which derives said output, wherein at least the lower-frequency components of said feedback signal are supplied to said first signal processing means and predominantly higher-frequency components are supplied to said second signal processing means.

Preferably the second processing means operates by analogue processing. Predominantly lower-frequency components only of said feedback signal (that is, to the general exclusion of higher frequency components) may be supplied to said first signal processing means.

Since the higher-frequency components of the feedback signal are supplied directly to the second processing means, the speed of operation of the first signal processing means does not have to be high enough to provide satisfactory response to every variation in the feedback signal. Only the second signal processing means needs to operate at a high enough rate to respond adequately to high-frequency variations in the feedback signal and thereby prevent instability of the control system.

Consequently, the digital processing circuitry in the first signal processing means can be relatively slow in operation (and therefore cheap) without prejudicing the ability of the system to provide accurate and reliable control. The greatest advantage is to be gained from the invention by making the second processing means of analogue processing circuitry, since this provides the necessary speed of operation at relatively low cost. However, even if the second processing means uses digital processing techniques (for example, to provide maximum scope and flexibility of operation), the cost penalty will be limited, because only the second processing means (rather than both first and second processing means) need include digital circuitry capable of very fast operation.

Two control systems in accordance with this invention for use in flight-control of an aircraft, will now be described, by way of example, with reference to the accompanying drawings.

DETAILED DESCRIPTION

The systems to be described are for use in replacing the conventional mechanical linkages in an aircraft between the pilot's controls and the moveable aerodynamic-control surfaces (namely elevators, ailerons and rudder) of the aircraft. Movement of the pilot's controls are sensed by electrical transducers which generate electrical signals representative of those movements, and the positions of the control surfaces and the motion of the aircraft are similarly sensed to produce two more groups of signals. The three groups of signals are supplied to servo-computers which derive from them the appropriate electrical command signals for supply to control-surface actuators in accordance with the pilot's demands in pitch, bank and yaw.

Figure 1:
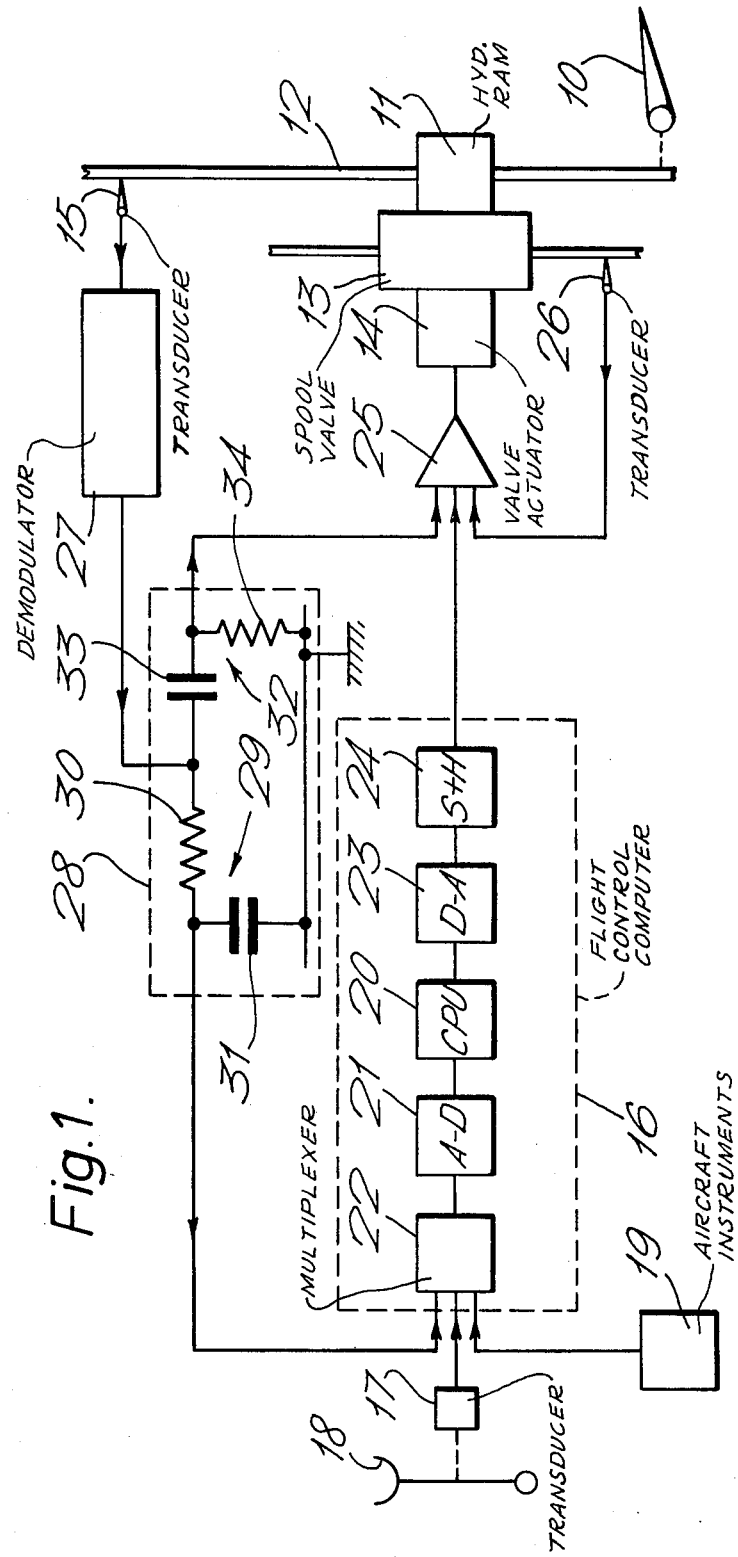
FIG. 1 is a block schematic diagram of one channel of a flight-control system.

One of the servo-computers used for control of the elevators of the aircraft is shown in FIG. 1; parts of this (and of each associated) servo-computer are also used for individual control of the ailerons and rudder.

Referring to FIG. 1, the elevators 10 of the aircraft are driven by a hydraulic ram 11 which is coupled to both elevator-surfaces 10 by a linkage 12. Hydraulic fluid is supplied to the ram 11 via a spool-valve 13 which is positioned by a servo-valve actuator 14.

The position of the linkage 12 is sensed by a transducer 15, which supplies an analogue signal in accordance with this position to a flight-control computer 16. The computer 16 also receives analogue signals in accordance with pitch demands signalled from a transducer 17 that is coupled to the pilot's control column 18.

Other analogue signals, in this case in accordance with motion of the aircraft, in particular the rate of change of attitude, are supplied to the computer 16 from appropriate instrumentation 19 of the aircraft.

The control computer 16 derives, from the input signals, intermediate or command signals appropriate for operation of the actuator 14 to control the elevator-surfaces 10 in accordance with the pilot's pitch-demand. To this end, the computer 16 includes a digital-processing unit 20 that, in accordance with a programmed computation, derives the appropriate command from the input data to the computer 16. These input data, being in analogue form, are supplied to the processing unit 20 via an analogue-to-digital converter 21 which receives the input signals in cyclic-succession from a multiplexer 22. The digital command derived by the unit 20 is supplied via a digital-to-analogue converter 23 and a sample-and-hold circuit 24 to an amplifier 25. This amplifier 25 compares the command signal with the signal supplied by a transducer 26 associated with the spool-valve 13. The transducer 26 provides an analogue signal in accordance with the position of the spool-valve 13 (and thus in accordance with the rate of movement of the ram 11) for application to the amplifier 25. The output signal of the amplifier 25 is representative of the error in position of the spool-valve 13, and is supplied to the actuator 14 in the sense to correct this error, and thereby provide for movement of the ram 11, and the linkage 12, at an appropriate rate, to the position required to satisfy the pilot's demands in pitch.

Considering the system in terms of feedback loops, there is a first feedback loop carrying a signal in accordance with the position of the linkage 12, as sensed by the transducer 15, and the path of this loop includes the digital control computer 16 and the amplifier 25. There is also a second feedback loop carrying a signal in accordance with the rate of movement of the linkage 12, as sensed by the transducer 26, and the path of this loop includes the amplifier 25 but not the control computer 16. Thus the first, position, feedback loop involves digital and analogue processing techniques, whereas the second, rate, feedback loop involves only analogue processing techniques.

As is explained in our U.S. application Ser. No. 776,488, filed Mar. 10, 1977, now U.S. Pat. No. 4,130,241 (to be referred to in more detail hereafter with reference to FIG. 2), the inclusion of the digital control computer 16 in the position feedback loop permits a reduction in the complexity of a control system of the type having several control lanes to ensure continued correct control in spite of the occurrence of a fault or failure in the system.

However, the inclusion of the digital control computer 16 in the position feedback loop may also result in an unacceptable restriction on the speed with which the signal supplied by the amplifier 25 responds to changes in the position of the linkage 12 as sensed by the transducer 15. This is because the individual calculations involved in the computation of the command signals of the control computer 16 are performed in a serial manner in a single arithmetic circuit in the digital-processing unit 20. The speed of operation of most digital-processing circuits is such that the complete, rather complex, cycle of calculations involved in a single computation may take several milliseconds. The command signal produced at the end of each cycle can incorporate changes consequent upon only those changes in the input and feedback signals occurring up until the start of that cycle. Thus there will be a delay of up to one cycle between the occurrence of any change in an input or a feedback signal and the appearance of a consequential change in the command signal, and this delay may well be several milliseconds in duration. Such a duration may be so long as to be incompatible with the speed of response of the actuator, to perturbations of the aircraft's attitude, which must be provided to ensure the safety of the aircraft.

One way of reducing the delay between variation of a feedback signal and the consequent response of the command signal would be to use especially fast digital processing circuits (such as those based on the emitter-coupled logic technique. However, such circuits are difficult to manufacture and therefore very expensive.

This invention provides another way of reducing the delay, without the need for specialized high-speed digital processing circuitry. In general terms, the digital flight-control computer 16 receives predominantly lower-frequency components of the feedback signal generated by the transducer 15. To this end, in the system shown in FIG. 1, the transducer 15 supplies its signal to the control computer 16 via a demodulator 27 and a filter circuit 28. The demodulator 27 is appropriate for use with transducers 15 of the type which provide as output an a.c. waveform modulated in amplitude or in frequency in accordance with the linkage position. The base-band signal representing the position directly (by, for example, the magnitude of a d.c. signal) is extracted from the a.c. waveform by the demodulator 27.

In the filter circuit 28, the input signal is applied to a low-pass RC filter 29, comprising a resistor 30 in series with a capacitor 31, and to a high-pass RC filter 32, comprising a capacitor 33 in series with a resistor 34. The junction of the resistor 30 and capacitor 31 is the low-pass output of the filter circuit and is connected to the multiplexer 22 in the control computer 16. The junction of the capacitor 33 and the resistor 34 is the high-pass output, and is connected to an input of the amplifier 25. The terminals of the capacitor 31 and the resistor 34 remote from these outputs are grounded. The values of the resistors 30 and 34 and of the capacitors 31 and 33 are chosen such that the low-pass filter 29 passes signals having a frequency up to 10–20 Hz, and the high-pass filter 32 passes signals higher in frequency than this.

The signal from the transducer 15 may be represented in terms of a power frequency spectrum in which the lower frequencies represent the slow, long-term changes in the transducer signal and therefore in the position of the linkage 12 (for example, the movements required to control the aircraft's attitude). These slow changes typically involve time periods of the order of several tens of milliseconds. On the other hand, the higher frequencies in the spectrum represent rapid, short-term changes in the position of the linkage 12 (such as the movements involved in vibration or instability), and involve time periods of only one or two milliseconds, or less.

Because lower frequencies predominate in the feedback signal supplied by the filter circuit 28 to the control computer 16, the command signal generated by the control computer 16 can respond without unacceptable delay to changes in this feedback signal. The time periods associated with the lower frequencies of the full feedback signal are substantially longer than the duration of one cycle of computation in the processing unit 20. Thus, by the time a slow cyclic change in the feedback signal, as represented by the lower-frequency components, has completed one cycle, the processing unit 20 will have completed several cycles of computation, thereby enabling the command signal to change as appropriate with the feedback signal.

The command signal is combined, in the amplifier 25, with the rate feedback signal from the transducer 26 and with the higher-frequency components of the position feedback signal supplied via the high-pass portion 32 of the filter circuit 28. Thus the higher-frequency components of the position feedback signal by-pass that part of the system which uses digital techniques, and are processed only by the demodulator 27 and the amplifier 25, which are analogue circuits. The operation of an analogue circuit is generally faster than that of the equivalent digital circuit, because the various processes of computation are carried on more or less simultaneously, any delay being caused predominantly by delays in propagation of signals through the circuit from input to output. Consequently, the amplifier 25 can provide the desired speed of response to the higher-frequency components of the feedback signal which represent the short-term changes in the position of the linkage 12, and thereby control the actuator 14 adequately to compensate for these changes, as necessary.

The input signals from the transducer 17 coupled with the pilot's control column 18 and from the aircraft instrumentation 19 are supplied solely to the control computer 16, that is, there is no by-pass provided for the higher-frequency components of these signals. However, input signals such as these are not normally subject to the kind of short-term variations which are often present in the signals in a feedback loop, so the speed of operation of the control computer is sufficient to provide adequate response to all changes in these input signals.

As noted earlier, it is common practice to provide more than one control lane in an aircraft flight-control system, as a precaution against the effects of a fault or failure in a control lane. A quadruplex double-failure-survival flight-control system incorporating the invention is shown in FIG. 2.

Figure 2:
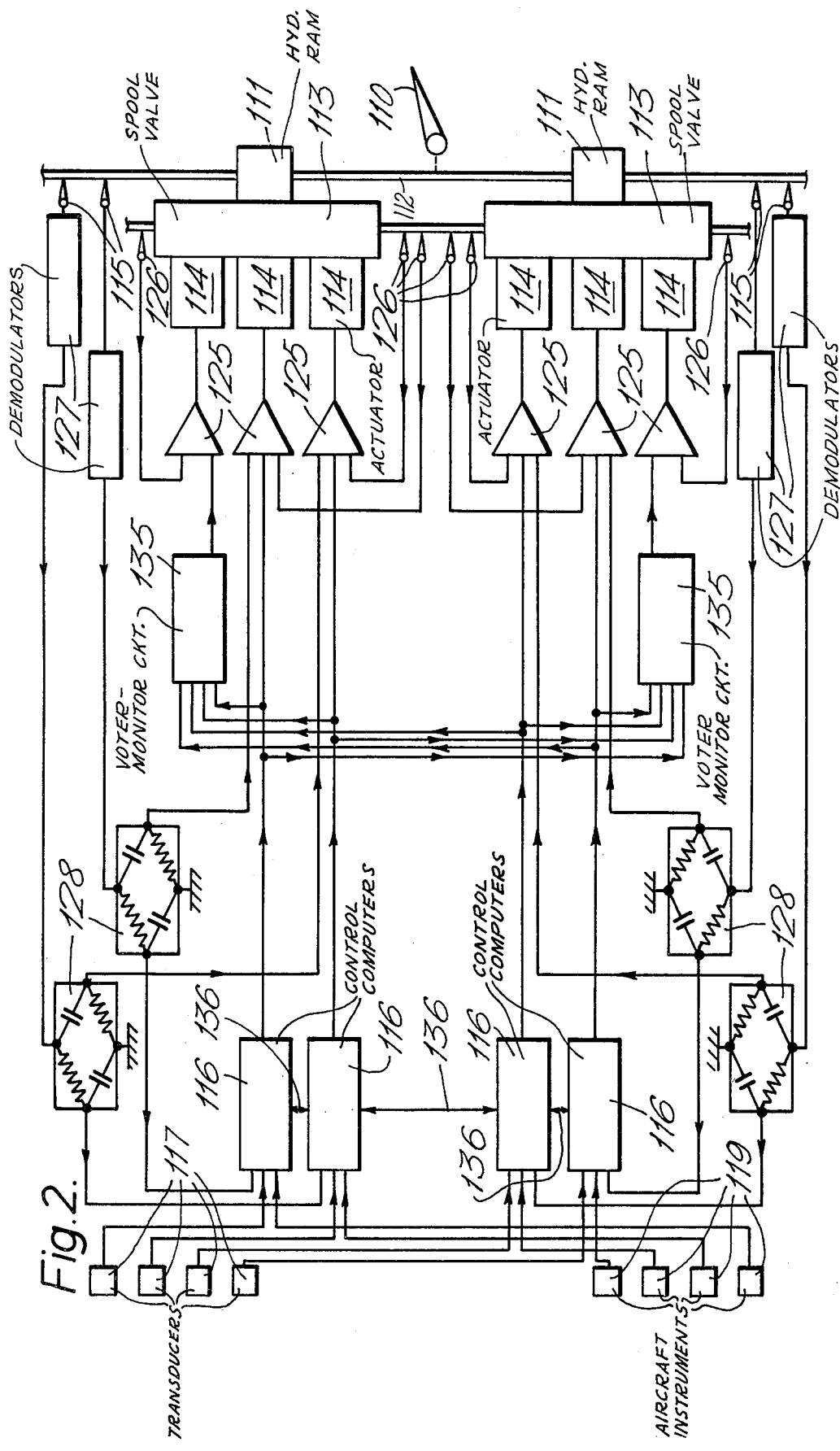
FIG. 2 is a block schematic diagram of a quadruplex double-failure-survival flight-control system incorporating four channels as shown in FIG. 1.

Referring to FIG. 2, the quadruplex system has four control lanes each similar to the system shown in FIG. 1, and like parts in the two figures have corresponding reference numerals, but increased by one hundred in FIG. 2. The command signal generated by each control computer 116 is compared with that generated by each of the other computers, and any difference between one command signal and the other three, in excess of a predetermined level, is treated as indicating that the control lanes generating the different command signal is faulty. Each control computer 116 has associated with it a separate linkage-position transducer 115, control-column transducer 117, aircraft instrumentation 119, demodulator 127 and filter circuit 128. Thus a fault in any of these pieces of equipment will also be detected through the perturbation it will cause in the command signal of the respective control computer 116.

Redundancy in the mechanical operation of the elevators 110 is ensured by the provision of two hydraulic rams 111 which are both coupled to the elevators 110 by the common linkage 112. Each ram 111 is supplied with hydraulic fluid via a respective spool valve 113, and the two spool valves 113 are intercoupled mechanically and are positioned by two respective groups of three actuators 114 each. Three actuators 114 are provided for each valve 113 so that if any one actuator 114 or its control circuitry fails, physical disconnection of that actuator 114 is unnecessary. This is because the remaining two actuators 114 associated with the same spool valve 113 as the affected actuator 114, and the three actuators 114 associated with the other spool valve 113, have sufficient power between them to resist any conflicting (and presumably incorrect) movements of the affected actuator 114.

The actuators 114 are controlled by respective ones of six amplifiers 125. Four of these amplifiers 125 (two for each spool valve 113) each receive a command signal direct from a respective one of the control computers 116, a rate-feedback signal from a respective transducer 126, and the higher-frequency components of a position feedback signal from a respective transducer 115 via a respective filter circuit 128.

The four control-computer command signals are also supplied to two voter-monitor circuits 135. These voter-monitor circuits 135 operate using digital processing techniques, each performing the above-described comparison of the four command signals, and also carrying out a process known as amalgamation on those signals. To this end, the circuit 135 first determines in respect of each command signal whether the magnitude of that signal differs by more than a predetermined amount from the magnitudes of the other three command signals. The command signal is accepted for amalgamation only if no differences are detected or if differences in excess of the predetermined level are detected between that signal and only one or two of the other three signals; if on the other hand excessive differences are detected in relation to all three other signals, the individual command signal is rejected, and a warning given that the associated control lane is faulty.

The accepted command signals are then amalgamated to obtain a single signal representative in value of the overall command supplied by the four control computers 116. This amalgamation may involve simply selection of one of the accepted signals (for example, the median-value signal), or computation of a new signal. For example, in the latter respect the amalgamated signal may be generated in accordance with computation of the arithmetic mean of the values of the accepted signals.

The amalgamated command signals generated by each voter-monitor circuit 135 are supplied by that circuit 135 to a respective one of the two amplifiers 125 that are not connected directly to the control computers 116. Each of these two amplifiers 125 is also supplied with a rate-feedback signal by a respective one of the transducers 126 coupled to the spool-valves 113.

The two amplifiers 125 which are coupled to the voter-monitor circuits 135, andd their respective actuators 114, enable the system to operate without provision for disconnection of any actuator 114 which attempts to operate in conflict with the other actuators 114, as mentioned earlier. The voter-monitor circuits 135 ensure that these two amplifiers 125 and their associated actuators 114 are supplied with signals that are not dependent on the fault-free operation of only one control computer 116 and its associated circuitry.

In order to reduce the likelihood of differences between the command signals of the different control computers 116, the signals received by these computers 116 for each parameter are also subjected to an amalgamation process, this process being carried out in the control computers 116 themselves. To this end, the control computers 116 exchange their respective input and feedback signals, after conversion to digital form, along paths 136. Each control computer 116 applies the same amalgamating process to the same set of signals for each parameter, so the amalgamated value derived in each computer 116 for each parameter should, during fault-free operation, be equal to the corresponding amalgamated value derived in the other computers 116. These amalgamated values are then used by the control computers 116 during computation of the command signals.

As is shown in FIG. 2, the position-feedback signals supplied via the filter circuits 128 to the control computers 116 are among the signals amalgamated by the computers 116. Such feedback of the linkage-position signals and subsequent amalgamation in digital form is described in our U.S. Pat. No. 4,130,241, and, as mentioned earlier, confers a reduction in the complexity of a multi-lane system such as that shown in FIG. 2. If the linkage-position signals were not treated in this manner, it would be necessary to provide six voter-monitor circuits, each similar to the circuits 135 and each responsive to every one of the computers 116, to generate an amalgamated command signal for every one of the amplifiers 125 and associated actuators 114. Feeding back the linkage-position signals to the inputs of the control computers 116 enables the required amalgamation to be carried out using the programmed instructions which are in any event required for amalgamation of the input signals supplied by the transducers 117 and the instrumentation 119.

At the same time, the possible restriction of speed of response of the system, which could arise by feeding back the linkage-position signals solely through the control computers 116, is avoided, as explained earlier with reference to FIG. 1, by the provision of the filter circuits 128. Thus, predominently lower-frequency components of the position-feedback signals are supplied for amalgamation and computation in the control computers 116. The higher-frequency components are supplied directly to four of the amplifiers 125, although not to the other two amplifiers 125 associated with the voter-monitor circuits 135.

As a result, in the system shown in FIG. 2, the higher-frequency components will not be subjected to any amalgamation. However, this is unimportant, because the changes in position of the linkage 112 represented by the higher-frequency components are transient in nature. Thus they do not produce the kind of long-term discrepancies between signals in the different lanes which amalgamation is intended to counteract. These long-term discrepancies manifest themselves primarily in the lower frequencies of the feedback signals, and amalgamation of these is adequately provided for in the control computers 116. Those two amplifiers 125 associated with the voter-monitor circuits 135 do not receive any of the higher-frequency components of the position-feedback signals. However, this is unimportant, because the other four amplifiers 125 are able to provide adequate response to these signals, and the transient, small-amplitude nature of the signals results in only small, temporary differences between the output signals of those four amplifiers 125 and the output signals of the two amplifiers 125 which do not receive the higher-frequency components.

Parts of the computers 16 and 116 in FIGS. 1 and 2 respectively are used for control of the ailerons and rudder, as well as of the elevators, as mentioned earlier with reference to FIG. 1. In particular, and referring to FIG. 1, the digital-processing unit 20, the analogue-to-digital converter 21, the multiplexer 22 and the digital-to-analogue converter 23 are operated on a basis of time-sharing between the subsystems for controlling the elevators, ailerons and rudder. However, the sample-and-hold circuit 24, the amplifier 25, the demodulator 27 and the filter circuit 28 (and, in FIG. 2, the voter-monitor circuits 135) are involved solely with control of the elevators, and other similar circuits are provided for the ailerons and the rudder respectively.

We claim:

1. A control system for deriving an output signal for control of an operative function, the system comprising: first signal processing means; means for supplying an input signal to said first signal processing means; means for deriving a feedback signal indicative of the said operative function; means for supplying at least the lower-frequency components of said feedback signal to said first signal processing means, the said first signal processing means deriving an intermediate signal from said input signal and said components of the feedback signal by digital processing; second signal processing means; means for supplying said intermediate signal to said second signal processing means; and means for supplying predominantly higher-frequency components of said feedback signal to said second signal processing means, the said second signal processing means deriving said output signal by processing said intermediate signal and said predominantly higher-frequency components of said feedback signal.

2. A control system according to claim 1 wherein predominantly lower-frequency components only of said feedback signal are supplied to said first signal processing means.

3. A control system according to claim 1 wherein said second signal processing means operates by analogue processing.

4. A control system according to claim 1 including means for supplying second feedback signals to said second signal processing means for use in deriving said output signal.

5. A control system according to any one of the preceding claims including means for supplying said output signal to actuator means, said actuator means being for controlling displacement of aerodynamic control-surfaces of an aircraft, and means for supplying said input signal in response to desired displacement of said control-surfaces.

6. A control system according to claim 5 wherein said feedback signal is indicative of the position of said control surfaces.

7. A control system for deriving a plurality of nominally-identical output signals for control of an operative function, the system comprising: a plurality of first signal processing means; means for supplying nominally-identical input signals to each said first signal processing means; means for deriving feedback signals indicative of said operative function; means for supplying at least the lower-frequency components of said feedback signals to each said first signal processing means; said first signal processing means deriving nominally identical intermediate signals from said input signals and said components of the feedback signal by digital processing; a plurality of second signal processing means; means for supplying each of the said intermediate signals to an individual one of said second signal processing means; and means for supplying predominantly higher-frequency components of said feedback signals to each said second signal processing means, the said second signal processing means deriving said nominally-identical output signals by processing said intermediate signals and said predominantly higher-frequency components of said feedback signals.

8. A control system according to claim 7 including monitor means; means for supplying said nominally-identical intermediate signals to said monitor means to produce an output signal therefrom, the said monitor means rejecting any of said intermediate signals that differ from others of said intermediate signals by more than a predetermined amount; further second signal processing means; and means for supplying the output signal from said monitor means to said further second signal processing means.

9. A control system according to claim 8 wherein said monitor means amalgamates those of said intermediate signals supplied to it that are not rejected so as thereby to produce a single output signal from said monitor means representative of those said intermediate signals.

10. A control system according to claim 7 wherein each said first signal processing means compares said input and feedback signals supplied to said first signal processing means with respective input and feedback signals supplied to others of said first signal processing means, the said first signal processing means rejecting any of said input and feedback signals that differ from others of said input and feedback signals by more than a predetermined amount, and the said first signal processing means deriving said intermediate signals in accordance with those of said input and feedback signals not rejected.

11. A control system according to claim 10 wherein each of said first signal processing means amalgamates those said input signals and those said feedback signals which are not rejected so as thereby to produce nominally-identical amalgamated values, and said first signal processing means deriving said intermediate signals from said amalgamated values by digital processing.

12. A control system according to any one of claims 7 to 11 including means for supplying each of said nominally-identical output signals to an individual one of a plurality of actuator means, said actuator means being for controlling displacement of aerodynamic control-surfaces of an aircraft, and means for supplying said nominally-identical input signals in response to desired displacement of said control surfaces.

* * * * *